(12) United States Patent
Brandon, II

(10) Patent No.: US 10,091,854 B1
(45) Date of Patent: Oct. 2, 2018

(54) PORTABLE LIGHT CONTROL APPARATUS

(71) Applicant: Energizer Brands, LLC, St. Louis, MO (US)

(72) Inventor: Michael J. Brandon, II, North Ridgefield, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 15/658,984

(22) Filed: Jul. 25, 2017

(51) Int. Cl.
| | |
|---|---|
| *H05B 33/08* | (2006.01) |
| *F21L 4/00* | (2006.01) |
| *F21S 9/00* | (2006.01) |
| *H05B 37/02* | (2006.01) |
| *F21Y 115/10* | (2016.01) |
| *F21V 21/084* | (2006.01) |
| *F21V 23/04* | (2006.01) |

(52) U.S. Cl.
CPC ..... *H05B 33/0854* (2013.01); *H05B 33/0851* (2013.01); *H05B 33/0872* (2013.01); *H05B 37/0218* (2013.01); *F21L 4/00* (2013.01); *F21V 21/084* (2013.01); *F21V 23/0414* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 5,721,471 A | 2/1998 | Begemann et al. | |
| 7,122,973 B1 * | 10/2006 | Ivers | H05B 39/047 |
| | | | 315/291 |
| 7,293,893 B2 | 11/2007 | Kim | |
| D592,782 S | 5/2009 | Hine et al. | |
| 9,125,274 B1 | 9/2015 | Brunault et al. | |
| 9,474,128 B2 | 10/2016 | Hoang | |
| 2016/0165699 A1 | 6/2016 | Yoon | |
| 2016/0381761 A1 | 12/2016 | Tseng et al. | |
| 2017/0067605 A1 | 3/2017 | Kuo et al. | |

OTHER PUBLICATIONS

Cassissi, Vito, "Lux Auto Brightness—Android Apps on Google Play", Jul. 24, 2012 to Oct. 11, 2017, Internet Archive Wayback Machine, retrieved from <https://web.archive.org/web/20120801000000*/https://play.google.com/store/apps/details?id=com.vito.luxon>, retrieved on Mar. 28, 2017, 2 pages.

* cited by examiner

*Primary Examiner* — Dedei K Hammond
(74) *Attorney, Agent, or Firm* — Alston & Bird LLP

(57) ABSTRACT

A portable lighting device such as a flashlight, headlight, or electric lantern comprises an onboard power supply (e.g., one or more batteries), a light source (e.g., one or more LEDs), and an onboard controller for regulating the light emitted by the portable lighting device. The onboard controller is in communication with one or more sensors configured to monitor component characteristics, such as a light source temperature and/or a power supply voltage. Based at least in part on the monitored characteristics, the controller is configured to generate a start-up ramp profile to gradually increase the brightness level emitted by the light source according to a defined brightness rate of change. After a power switch for the portable lighting device is activated, the controller initializes the start-up ramp profile to gradually increase the brightness emitted from the portable lighting device to a steady-state brightness level.

20 Claims, 6 Drawing Sheets

PORTABLE LIGHT CONTROL APPARATUS

BACKGROUND

Portable lighting devices, such as flashlights, electric torches, electric lanterns, and/or the like have historically operated in a generally "digital" manner, in which the light is either fully on (i.e., at a full brightness level) or fully off (i.e., emitting no illumination). Various flashlights may have intermediate levels of illumination, however changes between each of these levels of illumination are generally very abrupt, without a noticeable transition period between the illumination levels. Light Emitting Diode (LED) flashlights are known to have particularly abrupt changes in illumination level, because LEDs do not include any filaments or ballast members that are required to heat up for full illumination, as may be the case for certain incandescent and fluorescent bulbs.

Abrupt changes in illumination levels such as those commonly associated with LED portable lighting devices as noted above, can be jarring to human eyes, which generally require a period of time to adjust to changes in illumination level. Thus, particularly when turning on or turning off a portable lighting device in a dark room, the user may experience a short period of impaired vision while the user's eyes adjust to the new illumination level.

The accommodation of human eye adjustment periods in portable lighting devices has historically been hindered by a number of portable lighting device-specific challenges. For example, the interchangeability of power supplies (e.g., batteries) having differing voltage and current output capabilities makes management of illumination levels in portable lighting devices challenging. Accordingly, a need exists for control mechanisms enabling desirable illumination level control for portable lighting mechanisms.

BRIEF SUMMARY

Various embodiments are directed to portable lighting device controllers and methods of manipulating light output by a portable lighting device based on detected characteristics of the lighting device and/or environmental characteristics. Through the use of various onboard sensors, the portable lighting device controllers may be configured to identify and accommodate characteristics of a portable lighting device power supply (e.g., one or more batteries, light source (e.g., one or more LEDs), and/or the like. For example, the portable lighting device controller may be configured to adjust an initialization sequence of the light source based on a detected output voltage of the onboard power source, and/or to adjust the illumination level of the light source based on the power supply and/or light source temperature.

Various embodiments are directed to a portable lighting device having a power switch and an onboard controller. The controller of the portable lighting device may be configured to monitor characteristics of one or more onboard device components; and after the power switch is activated, initialize a start-up sequence to gradually increase the brightness emitted by the portable lighting device to a steady-state brightness level, wherein the start-up sequence defines a brightness rate of change identified based at least in part on one or more of the monitored characteristics. In certain embodiments, the portable lighting device further comprises an onboard power supply and a light source comprising one or more light emitting diodes, and wherein the onboard controller comprises a current regulation circuit configured to gradually increase a current level flowing from the onboard power supply to the light source in accordance with the brightness rate of change to cause a gradual increase in the brightness emitted by the portable lighting device.

In certain embodiments, the monitored onboard device components may comprise an onboard power supply and a light source, and wherein the portable lighting device further comprises at least one characteristic sensor configured to monitor the one or characteristics of the onboard device components. In certain embodiments, the onboard power supply comprises one or more batteries, and wherein the onboard controller is configured to: detect a battery output voltage of the one or more batteries; and identify a brightness rate of change for the light source based at least in part on the detected battery output voltage. Moreover, in certain embodiments, the start-up sequence for the portable lighting device defines a steady-state brightness level for the light source and wherein the onboard controller is configured to select the steady-state brightness level based at least in part on the detected battery output voltage. Moreover, in certain embodiments, the onboard controller is further configured to, after the portable lighting device reaches the steady-state brightness level, change the steady-state brightness level based on one or more of the monitored characteristics. In various embodiments, the one or more onboard device components comprise an onboard power supply; and wherein the onboard controller is configured to change the steady-state brightness level upon determining a voltage of the onboard power supply satisfies a dimming criteria. In certain embodiments, the one or more onboard device components comprise a light source; and wherein the onboard controller is configured to change the steady-state brightness level upon determining that a temperature of the light source satisfies a dimming criteria.

In various embodiments, the onboard controller is further configured to: monitor one or more environmental characteristics; and generate the startup sequence based at least in part on the one or more environmental characteristics. Moreover, the portable lighting device may comprise an environmental brightness sensor configured to monitor a brightness of an environment surrounding the portable lighting device. In certain embodiments, the onboard controller is further configured to: after the power switch is deactivated, initialize a power-down sequence to gradually decrease the brightness emitted by the portable lighting device to an off state, wherein the power-down sequence defines a second brightness rate of change.

Certain embodiments are directed to a portable lighting device controller configured to: monitor characteristics of one or more portable lighting device components; and after a power switch for the portable lighting device is activated, initialize a start-up sequence to gradually increase an output brightness emitted by the portable lighting device to a steady-state brightness level, wherein the start-up sequence defines a brightness rate of change identified based at least in part on one or more of the monitored characteristics. In certain embodiments, the portable lighting device controller is further configured to gradually increase the current level flowing across the portable lighting device controller in accordance with the defined brightness rate of change. Moreover, various embodiments of the portable lighting device controller comprise an integrated circuit chip and one or more characteristic sensors in electrical communication with the integrated circuit chip, and wherein monitoring characteristics of the one or more portable lighting device components comprises monitoring outputs received from the one or more characteristic sensors. The one or more characteristic sensors may comprise: a voltage sensor configured to monitor an output voltage of one or more batteries powering the portable lighting device; and a temperature sensor configured to monitor a temperature of a light source. Moreover, the portable lighting device controller may be further configured to detect a battery output voltage of the one or more batteries; and select a brightness rate of change for the light source based at least in part on the detected battery output voltage. In certain embodiments, the start-up sequence for the portable lighting device defines a steady-state brightness level for the light source and wherein the portable lighting device controller is configured to select the steady-state brightness level based at least in part on the detected battery output voltage.

Various embodiments are directed to a method for initializing a portable lighting device, wherein the portable lighting device comprises a power switch and an onboard controller. In certain embodiments, the method comprises: monitoring, via the onboard controller, characteristics of one or more onboard device components; and after the power switch is activated, initializing a start-up sequence to gradually increase the brightness emitted by the portable lighting device to a steady-state brightness level, wherein the start-up sequence defines a brightness rate of change identified based at least in part on one or more of the monitored characteristics.

Moreover, in various embodiments, the portable lighting device further comprises an onboard power supply and a light source, and the method may further comprise: detecting a battery output voltage of the one or more batteries; and identifying a brightness rate of change for the light source based at least in part on the detected battery output voltage. In certain embodiments, the portable lighting device further comprises a light source, and the method may further comprise: after the potable lighting device reaches the steady-state brightness level, changing the steady-state brightness level upon determining that a temperature of the light source satisfies a dimming criteria.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
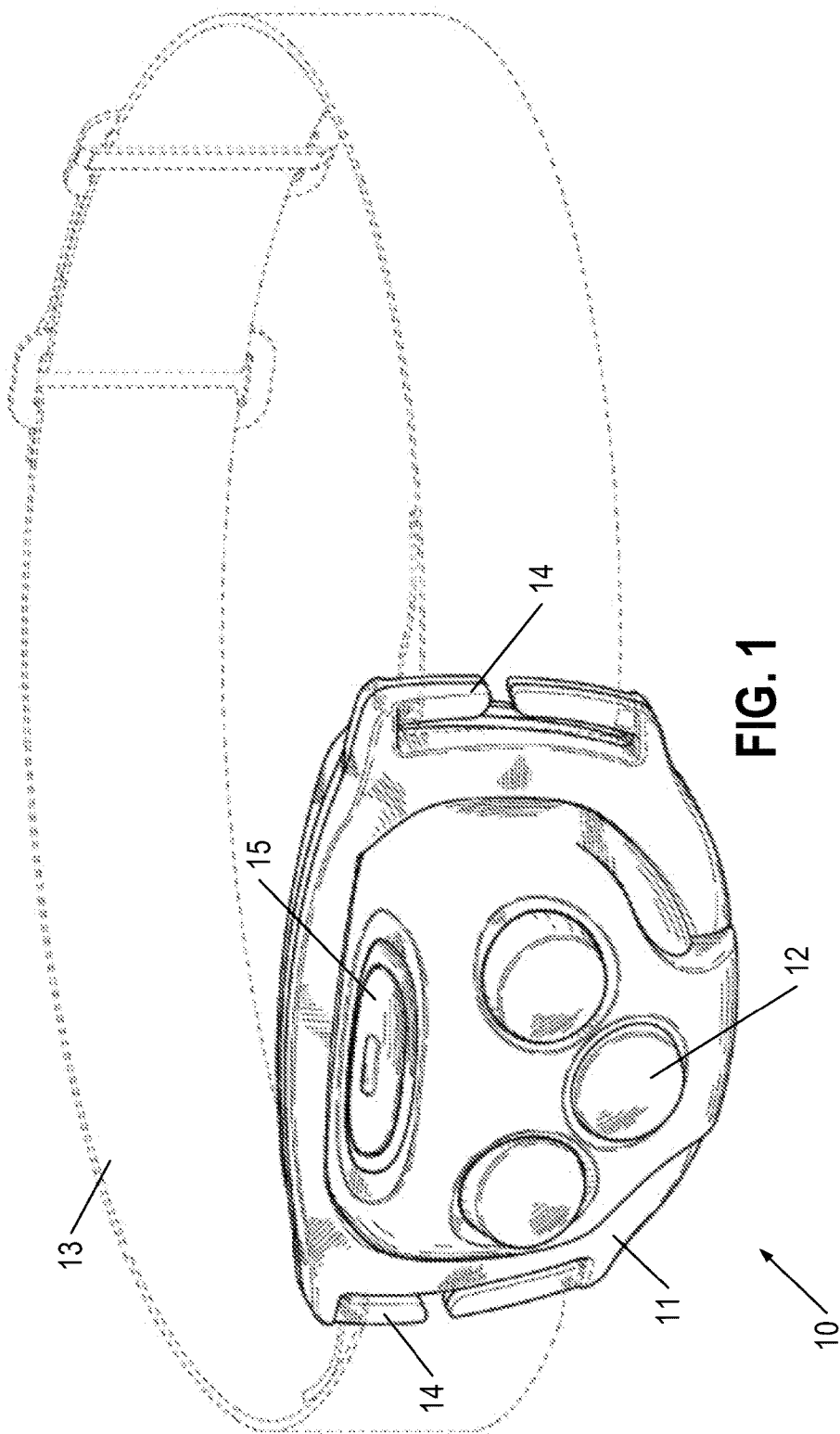
FIG. 1 shows an example portable lighting device in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

As noted above, human eyes gradually adjust to illumination level changes, which can cause individuals to experience temporary vision impairment when moving quickly between areas having different illumination levels (e.g., stepping into a dark enclosure from a bright outdoor area or vice versa). Human eyes are unable to rapidly adjust to changes in levels of illumination, and therefore human eyes are often forced to "catch up" to abrupt changes in illumination to enable an individual to effectively see in the new illumination level of his or her surrounding environment.

Human eyes are generally better suited to adjust to more gradual changes in illumination level, and therefore eyes are generally not subject to temporary vision impairment during such gradual changes. Thus, in order to accommodate the more gradual adjustment period of human eyes to changes in illumination level, various embodiments are directed to lighting controllers configured for use with portable lighting devices, such as flashlights, headlights, electric torches, electric lanterns, and/or the like. Thus, when used to illuminate otherwise dim or dark environments, these portable lighting devices may not provide abrupt changes in illumination level that may cause temporary vision impairment for the user.

Moreover, gradually increasing the illumination level of a portable lighting device having an onboard power supply (which itself may have a finite capacity for providing electrical current) conserves power of the onboard power supply during a gradual transient period, such that the portable lighting device conserves power of the onboard power supply until a period of time occurring a period of time after the portable lighting device is activated. In certain embodiments, utilizing a gradual increase in brightness may result in the portable lighting device emitting a brighter light at an instant in time occurring a predefined time after activation (e.g., 30 seconds after activation) as compared to an identical lighting device having an at least substantially instantaneously increase a maximum brightness level after the same predefined time period (e.g., 30 seconds after activation), due to the power conservation of the onboard power supply during the gradual transient period of increasing brightness.

In certain embodiments, the lighting device controller may be embodied as an onboard lighting device controller (e.g., a microprocessor) operating to control the current level flowing from an onboard power supply (e.g., one or more batteries) to a light emitter (e.g., one or more LEDs) to provide a gradual increase and/or decrease in illumination level emitted from the light emitter between a maximum illumination level and a zero illumination level upon a user turning the light on and/or off. The gradual increase and/or decrease in illumination level is performed according to a defined brightness rate of change (e.g., a number of lumens per unit of time) executable by the lighting device controller. The lighting device controller may have one or more defined ramp up and/or ramp down lighting profiles setting the rate of illumination increase and/or decrease (e.g., having a defined brightness rate of change) for the lighting device.

Moreover, the lighting device controller may be in connection with one or more sensors configured to monitor characteristics of the lighting device and/or environmental characteristics to adjust and/or select a lighting profile. For example, the lighting device controller may monitor the power supply temperature, power supply voltage, light emitter current draw, light emitter temperature, environmental brightness, environmental temperature, and/or the like to select and/or adjust a lighting profile.

The lighting device controller may also periodically and/or constantly monitor various characteristics of the lighting device and/or the environment to adjust an illumination level of the lighting device during steady state operation (e.g., after completing a transient ramp-up period). For example, the lighting device controller may constantly monitor the temperature of the light emitter and/or the voltage of the power supply to constantly optimize the illumination level emitted by the light emitter.

Portable Lighting Device

FIG. 1 illustrates a portable lighting device 10 according to various embodiments. As shown in FIG. 1, the portable lighting device 10 may be configured as a headlamp configured to be worn on the head of a user, however it should be understood that the portable lighting device 10 may be embodied as other types of wearable lighting devices (e.g., arm-band mounted lighting devices, clip-on lighting devices, helmet lighting devices, and/or the like), a handheld light (e.g., a flashlight, a lantern, and/or the like), a self-powered vehicle light (e.g., a bicycle light), and/or the like.

As shown in FIG. 1, various embodiments of the portable lighting device 10 may comprise a housing 11 supporting various lighting device components (e.g., within the housing 11 and/or on the housing 11). For example, the portable lighting device 10 may comprise one or more lenses 12 secured relative to the housing 11. The lenses may cover one or more light sources (not shown in FIG. 1), such as light bulbs, light filaments, light panels, and/or the like. As just one non-limiting example, the light sources may comprise one or more light emitting diodes (LEDs). In embodiments in which the light source comprises one or more LEDs, the emitted brightness level of the portable lighting device 10 may be dependent on the level of electrical current flow across each of the LEDs.

In certain embodiments, the light sources may, collectively, be configured for emitting light according to one or more wavelengths (e.g., various colors). For example, the one or more light sources may comprise one or more first light sources configured to emit light according to a first wavelength (e.g., a first color), and one or more second light sources configured to emit light according to a second wavelength (e.g., a second color). As just one non-limiting example, the one or more light sources may comprise light sources configured to emit white light, and light sources configured to emit red light.

With reference again to FIG. 1, the portable lighting device 10 may comprise a support strap 13 (e.g., a headband) that may be used to secure the portable lighting device 10 to a user. The support strap 13 may be secured to the housing 11 via one or more strap clips 14. As mentioned above however, it should be understood that various embodiments may not include a support strap 13, and may instead include any of a variety of other support mechanisms, such as handles, clips, loops, hook-and-loop fasteners, and/or the like.

Figure 2:
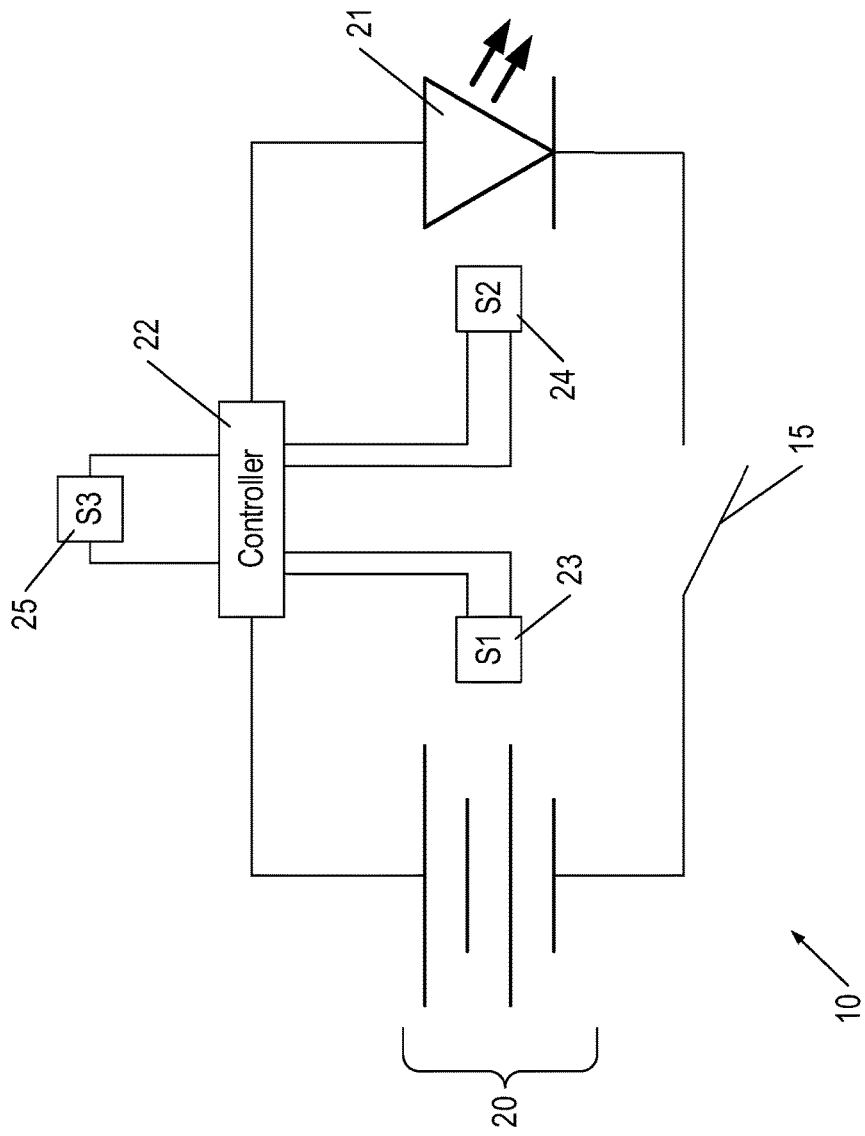
FIG. 2 shows an example schematic circuit diagram illustrating a portable lighting device having an onboard controller in accordance with various embodiments.

Moreover, as shown in FIG. 1, the portable lighting device 10 may comprise a power switch 15 configured to enable a user to turn the light on and/or off (and/or to select between a plurality of lighting states). The power switch 15 may be embodied as a button, a pivot switch, a knob, one or more touch-sensitive contacts, and/or the like. Moreover, in certain embodiments, the power switch 15 may comprise a first power switch (e.g., to turn the portable lighting device on and/or off) and a second power switch (e.g., to select between a plurality of illumination states). With reference briefly to FIG. 2, the power switch 15 may serve to close a circuit between a power supply 20 and the light source 21.

FIG. 2 is a schematic diagram of the various components of a portable lighting device 10 according to one embodiment. As shown in FIG. 2, the portable lighting device 10 comprises a power supply 20 that is selectively in electrical connection with a light source 21. Both the power supply 20 and the light source 21 are onboard components, and need not receive power from an external source to operate. As shown in the schematic diagram of FIG. 2, the light source 21 may be embodied as one or more LEDs, although any of a variety of light sources may be provided (e.g., incandescent light bulbs, fluorescent light bulbs, light panels, and/or the like). Although not shown, in embodiments in which the light source 21 comprises a plurality of lighting devices (e.g., a plurality of LEDs), the lighting devices may be provided in series and/or in parallel. Moreover, as discussed in greater detail herein, subsets of the plurality of lighting devices may be provided on separate lighting circuits electrically connected to the onboard controller 22, such that each of the separate lighting circuits may be operated independently of one another.

As mentioned, the power supply 20 may be an onboard power supply in which the power supply is entirely encompassed within the portable lighting device 10. In such embodiments, the power supply 20 may be embodied as one or more batteries (e.g., alkaline batteries, lithium iron disulfide batteries, and/or the like) providing a direct current (DC) output voltage. In various embodiments, each of the one or more batteries may have a nominal open circuit output voltage of 1.5 volts, although specific battery types having corresponding battery chemistries may have distinct specific output voltages (e.g., within a defined tolerance of 1.5 volts). For example, alkaline batteries may have an output voltage of at least substantially 1.6V, when new; and lithium iron disulfide batteries may have an output voltage of at least substantially 1.8V, when new. The portable lighting device 10 may be configured to accept and/or utilize any of a variety of battery types.

In embodiments in which the power supply 20 comprises a plurality of batteries, the plurality of batteries may be provided in parallel to provide an extended run-time of the portable lighting device 10, or the batteries may be provided in series to provide an increased output voltage for the power portable lighting device 10. As noted above, the power supply 20 may be on a single circuit with the light source 21, with a switch 15 disposed therein to selectively open and close the circuit to turn the portable lighting device 10 off and/or on. The switch 15 is shown as a separate electrical component in the embodiment of FIG. 2, although it should be understood that in certain embodiments, the switch may be embodied as a portion of the controller 22.

The controller 22 may be embodied as an integrated circuit chip configured to perform logical operations according to an algorithm stored in non-transitory memory thereon. As shown in the schematic of FIG. 2, the controller 22 may be provided in series with the power supply 20 and the light source 21 on a switched circuit that selectively provides power from the power supply 20 to the light source 21 and the controller 22. However, in certain embodiments, the controller 22 may be disposed on a separate, parallel power circuit with the power supply 20, the parallel power circuit being unswitched such that the controller 22 may receive an at least substantially constant electric current from the power supply 20. In such embodiments, the controller 22 may remain in electrical communication with the lighting circuit having the light source 21 thereon, such that the controller 22 may control and/or regulate current flowing from the power supply 20 to the light source 21 (e.g., on one or more separate lighting circuits).

Moreover, as shown in FIG. 2, the controller 22 may be in communication with one or more sensors 23-25. The one or more sensors 23-25 may be configured to monitor one or more portable lighting device component characteristics and/or one or more environmental characteristics. For example, in the illustrated embodiment of FIG. 2, a first sensor 23 may be configured to monitor an output voltage of the power supply 20, a second sensor 24 (e.g., a thermocouple, a thermistor, an infrared temperature sensor, and/or the like) may be configured to monitor a temperature of the light source 21, and a third sensor 25 (e.g., a photovoltaic sensor), may be configured to monitor an ambient brightness level of an environment surrounding the portable lighting device 10. These sensors are provided merely as examples, as any of a variety of sensors and/or combinations of sensors may be provided. Other example sensors may comprise a power supply temperature sensor, an environmental temperature sensor, a light source emitted brightness sensor, an accelerometer, and/or the like.

In certain embodiments, the controller 22 and the one or more sensors may be operable only while the switch 15 is in an activated position (e.g., forming a closed circuit between the power supply 20, controller 22, and light source 21). Accordingly, the controller 22 and the one or more sensors may be configured to monitor device component characteristics and/or environmental characteristics beginning when a user activates the switch 15. However, in certain embodiments, the controller 22 and the one or more sensors may be configured to at least periodically monitor the device component characteristics and/or the environmental characteristics while the portable lighting device 10 is inactive, such that the controller 22 may be configured to initiate a particular ramp profile immediately upon the switch 15 being activated. For example, the controller 22 and one or more sensors may be configured to receive current from the power supply 20 via a separate controller circuit, as noted above.

Although not shown, the portable lighting device 10 may comprise additional components, such as a power plug and charging circuit (e.g., comprising a voltage converter) configured to be connected to an external power source to recharge the onboard power supply 20, in embodiments in which the onboard power supply comprises one or more secondary batteries. Various embodiments may comprise additional portable lighting device components and/or sensors for monitoring characteristics of those additional components.

Controller Configuration

As noted above, the controller 22 may be configured to control and/or regulate the operation of the light source 21. For example, the controller 22 may be configured to regulate the amount of current flowing from the power supply 20 to the light source 21 to regulate the output brightness of the light source 21. The controller 22 may generate and/or implement transient periods to gradually increase the brightness emitted from the light source 21 (e.g., via an included current regulation circuit configured to gradually increase the current flowing from the power supply 20 to a light source 21 embodied as one or more LEDs) from an off state (e.g., open circuit between the power supply 20 and the light source 21) to a steady state (e.g., full power with a maximum and/or uninterrupted current flowing from the power supply 20 to the light source 21 (e.g., one or more LEDs)).

The gradual increase in brightness occurs over a defined period of time, for example, according to a defined brightness rate of change (e.g., a defined number of lumens per unit of time) by selectively throttling electrical current flowing from the power supply 20, across the lighting device controller 22, to the light source 21 (e.g., by applying pulse-width modulation across the light source 21). Thus, rather than causing a full and/or maximum output current (and/or voltage) to flow from the power supply 20 to the light source 21 immediately upon closing the portable lighting device circuit, the controller 22 regulates the electrical current flow from the power supply 20 to the light source 21 to enable a desired gradual increase in brightness.

The gradual increase in brightness may enable a human user's eyes to gradually adjust to the increasing brightness level emitted by the portable lighting device 10. Moreover, the gradual increase in brightness may conserve electrical energy of an onboard power supply having a finite capacity for generating electric current, such that a maximum brightness emitted by the portable lighting device 10 may occur at an instance occurring a period of time after initialization of the portable lighting device 10. For example, comparing the brightness level of identical portable lighting devices 10 at an instant in time occurring 30 seconds after the portable lighting devices 10 are initialized, a portable lighting device 10 utilizing a gradual increase in brightness (wherein the transient period of increasing brightness is less than 30 seconds) may have a higher measured brightness level than an identical portable lighting device 10 utilizing an at least substantially instantaneous transition between an off state and a maximum brightness state upon initialization of the portable lighting device 10. The latter portable lighting device 10 may be expending electrical capacity of the onboard power supply at a maximum rate. Moreover, the gradual increase in brightness (and corresponding gradual increase in current flowing through the lighting device 10 onboard circuit) may also slow the rate of temperature increase of the onboard circuit, the onboard power supply 20, and/or the light source 21. In certain embodiments, by slowing the rate of increase of current flow across the lighting device 10 circuit, the overall temperature of the lighting device 10 may remain below a maximum temperature that an identical lighting device utilizing an at least substantially instantaneous transition between an off state and a maximum brightness state upon initialization of the portable lighting device.

Because the emitted brightness of LEDs is dependent at least in part on the level of electrical current flowing across the LEDs, gradually increasing the level of current flowing to a light source 21 comprising a plurality of LEDs causes a corresponding gradual increase in brightness emitted by those LEDs. Thus, a light source 21 comprising one or more LEDs may not reach a maximum brightness level at least substantially instantaneously after activating a power switch 15 of the portable lighting device 10 (as may be the case in which an onboard circuit of the portable lighting device 10 causes a maximum electrical current to flow between the power supply 20 and the lighting source 21 at least substantially instantaneously after closing the onboard circuit), but is instead subject to a gradual increase in brightness as the electrical current level flowing through the onboard electrical circuit gradually increases in accordance with the defined brightness rate of change implemented by the controller 22.

Moreover, the controller 22 may at least periodically monitor the output of the one or more sensors (e.g., sensors 23-25) to identify and/or generate an appropriate transient ramp-up profile for gradually increasing the brightness of the light source 21, and/or to adjust the steady-state brightness profile of the light source 21. In certain embodiments, the controller 22 may be configured to select from one or more predefined ramp profiles defining set parameters for gradually increasing the light level emitted from the light source 21. However, in certain embodiments, the controller 22 may be configured to generate an individualized ramp profile each time the portable lighting device 10 is initialized, based at least in part on monitored characteristics of onboard components and/or the environment surrounding the portable lighting device 10.

Figure 3:
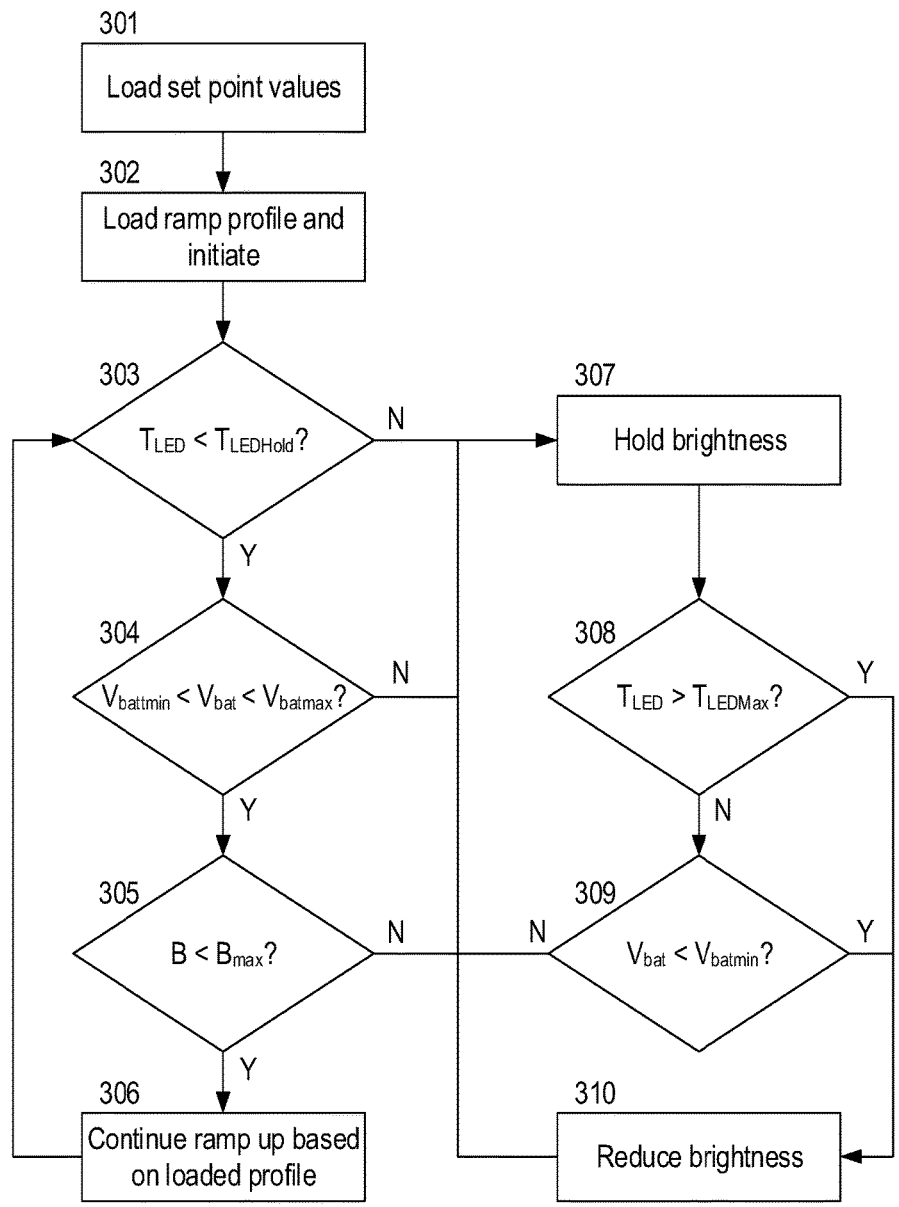
FIG. 3 is a flowchart illustrating various steps performed by a portable lighting device controller according to various embodiments.

FIG. 3 is a flowchart providing example controller 22 logic for gradually turning on the portable lighting device 10 and for adjusting the steady state lighting characteristics of the portable lighting device 10. As shown in FIG. 3, the controller 22 may be loaded with one or more set point values as shown at Block 301, which may be utilized by the controller when generating and/or implementing ramp-up profiles, and/or the like. These set point values may comprise a maximum output brightness (in embodiments comprising an output brightness sensor), a maximum current flowing to the lighting source, a maximum lighting source temperature, a maximum power source temperature, a maximum power source output voltage, a minimum power source output voltage, and/or the like. In various embodiments, the one or more set point values may be utilized to load and/or select a ramp profile, as indicated at Block 302. For example, as mentioned above, different battery types may have distinct output voltages, and the controller 22 may utilize a voltage sensor to detect the output voltage provided by a particular power supply. Based at least in part on set point values stored within the controller 22, the controller 22 may be configured to identify a particular power supply type, and to select an appropriate portable lighting device operational profile based on the determined power supply type.

For example, upon determining that the output voltage of the power supply 20 (or a battery within the power supply 20) is greater than or equal to 1.65V, the controller 22 may be configured to determine that the battery is an alkaline battery, and may be configured to select a first ramp profile corresponding to alkaline battery usage. Upon determining that the output voltage of the power supply 20 (or a battery within the power supply 20) is less than 1.65V, the controller 22 may be configured to determine that the battery is a lithium iron disulfide battery, and may be configured to select a second ramp profile corresponding to lithium iron disulfide battery usage. Additional ramp profiles may be provided as well, and the controller 22 may thus be configured to select between more than two ramp profiles in certain embodiments.

Each ramp profile may comprise ramp parameters controlling the operation of the portable lighting device 10. For example, the ramp profile may define a maximum brightness to be emitted by the light source 21, which may be defined with reference to a maximum current permitted to flow from the power supply 20 to the light source 21. The ramp profile may also define a brightness rate of change applicable to a transient period during which the light brightness is gradually increased when the switch 15 is activated. For example, the brightness rate of change may indicate that the brightness should be gradually and/or continuously increased from an off state to a maximum brightness, steady state (which may be defined by the ramp parameters) over a defined period of time (e.g., 10 seconds, 30 seconds, 60 seconds, 120 seconds, and/or the like).

As noted, the controller 22 may be configured to select a ramp profile based at least in part on a determined battery type (e.g., as determined based at least in part on an output battery voltage). Accordingly, the ramp profiles may be optimized for a particular battery chemistry. For example, due to the higher voltage outputs of lithium iron disulfide batteries as compared to alkaline batteries, the ramp profile may set a maximum current flow permitted to flow to the light source 21 from the power supply 20 to prevent or impede the light source 21 from overheating. In contrast, because alkaline batteries have a comparatively lower output voltage, the controller 22 may not set a maximum current flowing from the power supply 20 to the light source 21.

Moreover, as noted above, the controller 22 may be configured to monitor the output voltage of the power supply 20 and thereby load a ramp profile as noted at Block 302 while the portable lighting device 10 is inactive (e.g., the power switch 15 is in an off position). However, in certain embodiments, the controller 22 may be configured to receive signals from the one or more sensors and to load a ramp profile immediately upon the power switch 15 being activated to begin the ramp up of the portable lighting device 10.

With reference again to FIG. 3, the controller 22 may initiate the ramp profile after the portable lighting device 10 is activated and may at least periodically monitor the one or more component characteristics while the portable lighting device 10 is gradually increasing the brightness of the light source 21.

As shown at Block 303 of FIG. 3, the controller 22 may apply a light source temperature criteria to determine whether the brightness should be increased. For example, the controller 22 may compare the temperature of the light source 21 against a criteria temperature (e.g., a maximum light source temperature and/or a steady state light source temperature). If the controller 22 determines the light source temperature satisfies (e.g., exceeds) the criteria temperature, the controller 22 may hold the current brightness (e.g., by setting the maximum current flow to the light source 21 to be the present current flow).

If the controller 22 determines the light source temperature does not satisfy the criteria temperature, the controller 22 may apply a power supply criteria to determine whether the brightness should be increased. For example, the controller 22 may compare the output voltage of the power supply 20 (e.g., the one or more batteries) against one or more criteria voltage levels (e.g., a minimum output voltage and/or a maximum output voltage). Upon determining the battery voltage does not satisfy the criteria voltage levels (e.g., the battery voltage is below a minimum voltage level or the battery voltage exceeds a maximum voltage level), the controller 22 may be configured to hold the current brightness level. Thus, the controller 22 may be configured to maximize an expected runtime of the portable lighting device 10 upon determining the battery voltage is below a predefined threshold (e.g., indicating the battery charge is nearly exhausted) and/or the controller 22 may be configured to avoid overheating the light source 21 upon determining one or more high power batteries are providing current to the light source 21.

Upon determining that the battery voltage satisfies the criteria voltage levels, the controller 22 may be configured to determine whether the current brightness of the light source 21 satisfies a brightness criteria. For example, as shown at Block 305 of FIG. 3, the controller 22 may be configured to determine whether the current brightness is less than a maximum brightness level. In various embodiments, the brightness may be monitored directed, for example, via a brightness sensor, or the brightness may be measured by proxy, based on the current flowing to the light source 21. For example, a known relationship between current and brightness may be established, such that the brightness output level of the light source 21 may be estimated based at least in part on the current flow to the light source 21. In such embodiments, the brightness criteria may comprise comparing a present current flow to the light source 21 against a maximum current flow to the light source 21. In any event, upon determining the current brightness (and/or current) satisfies the brightness criteria (e.g., the brightness is greater than or equal to the maximum brightness), the controller 22 may hold the current brightness level. However, upon determining the brightness is less than the maximum brightness, the controller 22 may be configured to continue ramping up the brightness, as indicated at Block 306, and may continue to monitor the characteristics of the various components according to Blocks 303-305 as the brightness is increased.

It should be noted that the characteristics monitored according to Blocks 303-305 may be monitored in any order, and the order presented in FIG. 3 should not be construed as limiting. In various embodiments, the characteristics may be monitored in an alternative order or simultaneously.

As indicated at Block 307, the controller 22 is configured to hold the brightness emitted by the light source 21 upon determining that any of the brightness hold criteria are satisfied (e.g., as indicated at Blocks 303-305 of FIG. 3). Moreover, the controller 22 may continue to monitor various component characteristics as indicated at Blocks 308-309 of FIG. 3.

Specifically, the controller 22 may be configured to at least periodically monitor the temperature of the light source 21 relative to a temperature criteria. As indicated at Block 308, the controller 22 may be configured to determine whether the light source temperature exceeds a maximum light source temperature. Upon determining that the light source temperature exceeds the maximum light source temperature, the controller 22 may be configured to reduce the brightness of the light source 21 (e.g., by reducing the current level flowing to the light source 21) by a predetermined amount, as indicated at Block 310. For example, the controller 22 may reduce the current flowing to the light source 21 by a predefined percentage (e.g. 25%, 15%, 10%, 5%, 1% and/or the like), by a predefined amperage (e.g., 200 mA, 150 mA, 100 mA, 50 mA, 25 mA, 10 mA, and/or the like), and/or the like.

Upon determining the light source temperature does not exceed the maximum light source temperature, the controller 22 may be configured to monitor the battery output voltage relative to a voltage criteria. As indicate at Block 309, the controller 22 may be configured to determine whether the battery output voltage falls below a minimum battery output voltage. Upon determining that the battery output voltage falls below the minimum battery output voltage, the controller 22 may be configured to reduce the brightness of the light source 21 by a predetermined amount, as indicated at Block 310 and discussed above in reference to Block 308. Again, as noted above, the controller 22 may thus be configured to extend the expected runtime of the portable lighting device 10 by reducing the brightness of the light source 21 once the one or more batteries of the power supply are diminished by comparing the output voltage of the one or more batteries against a minimum battery threshold. If the battery voltage is below the minimum voltage threshold, the controller 22 reduces the brightness of the light source 21 to extend the expected runtime of the portable lighting device 10.

After reducing the brightness of the light source 310, the controller 22 may be configured to hold the brightness at the newly established brightness level, and to again at least periodically monitor the component characteristics as indicated at Blocks 308-309. Again, the presented order of Blocks 308-309 should be construed as limiting for monitoring the various component characteristics, as these component characteristics may be monitored in any order or simultaneously.

Figure 4:
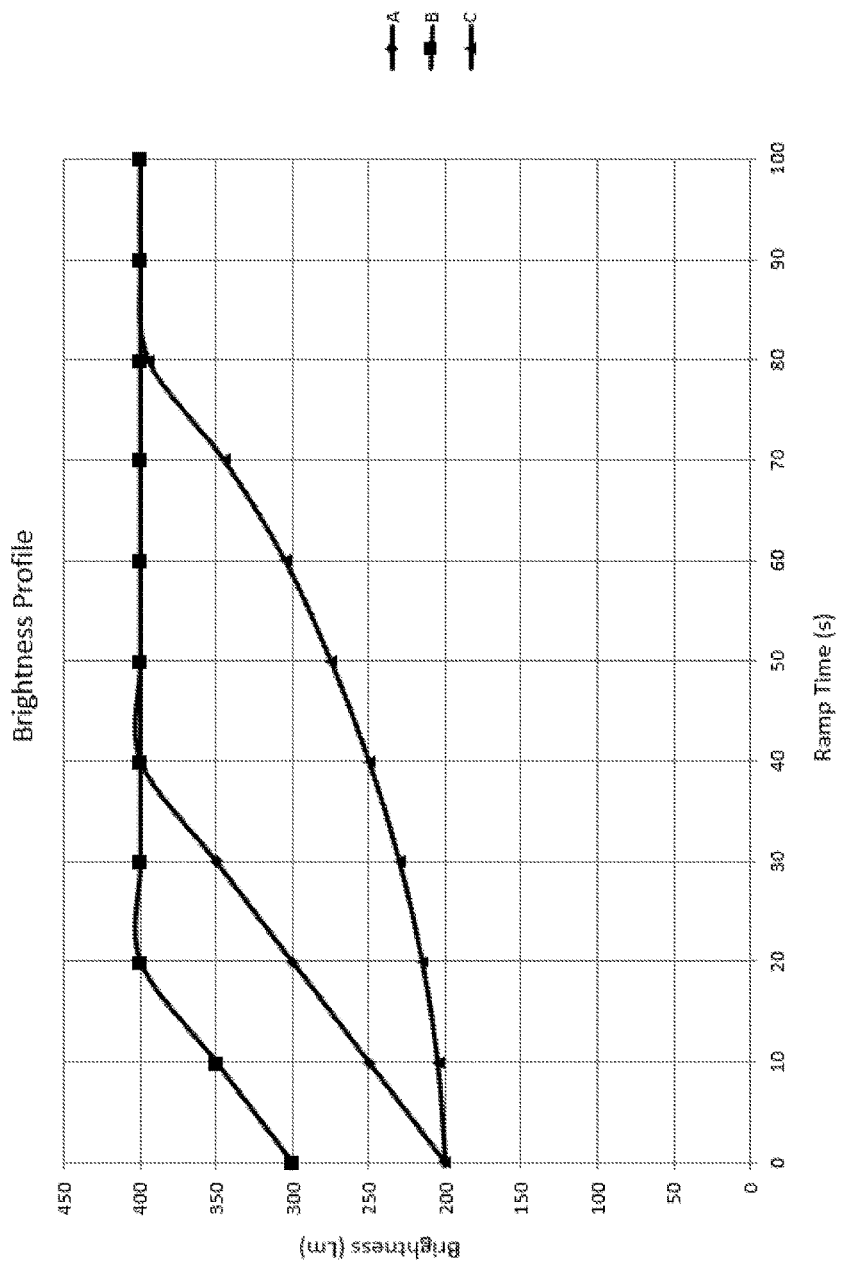
FIGS. 4-6 are example light emission profiles from a portable lighting device according to various embodiments.

The controller 22 may thus control the rate at which the light source 21 brightness increases, and may at least periodically monitor and/or adjust the brightness of light source 21. FIG. 4 illustrates three example ramp profiles implemented for increasing the brightness of a light source 21. As shown in FIG. 4, the ramp profile may be configured to reach a steady state brightness level (e.g., lumens, current level, and/or the like) in 30 seconds, 40 seconds, 80 seconds, and/or the like. As shown in FIG. 4, the controller 22 may be configured to provide a linear rate of brightness change (as indicated by lines A and B) or a non-linear rate of brightness change (as indicated by line C).

Additional Controller Configurations

In various embodiments, the controller may be configured to adjust additional attributes of the light source 21 output, such as light output color and/or correlated color temperature (CCT) of the light output.

As noted herein, the light source 21 may be configured for emitting light in various colors and/or CCT levels. The light source 21 may comprise a plurality of light emitters (e.g., a plurality of LEDs) each of which configured for emitting a different color light. As just one non-limiting example, the light source 21 may comprise a green light emitter, a red light emitter, and a blue light emitter. Each of the various light emitters may be independently operable by the controller 22, such that the overall color and/or CCT level of the light emitted from the light source 21 may be adjusted.

Figure 5:
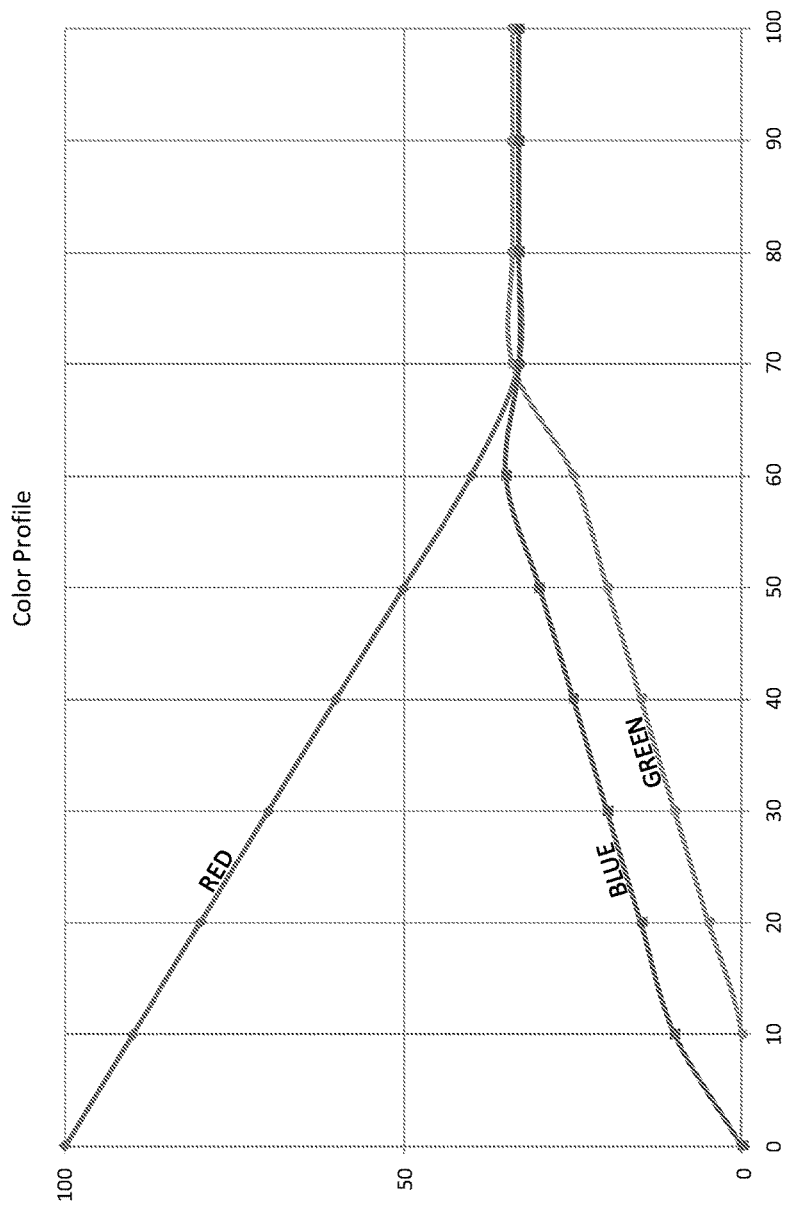

For example, as shown in FIG. 5, which illustrates a time-based chart illustrating the relative brightness of red, green, and blue light emitters in a portable lighting device 10 as a function of time after the portable lighting device 10 is activated. As shown in FIG. 5, the controller 22 may be configured to begin the ramp-up profile by activating only the red light emitter (such that 100% of the emitted light originates from the red light emitter), and gradually introducing blue and green light such that a decreasing proportion of emitted light is red light and an increasing proportion of emitted light is green and blue, until the red, green, and blue light emitters provide at least substantially equal light levels (e.g., 33.33% of the emitted light originates from each) to provide a white light from the portable lighting device 10. In such a configuration, the controller 22 may be configured to selectively ramp up the electrical current level provided to the red light emitter initially, and then to gradually increase the electrical current level provided to the blue and/or green light emitters (disposed in a parallel electrical circuit) after the red light emitter has reached a steady-state brightness level. The controller 22 may be configured to simultaneously and/or consecutively decrease the current level flowing to the red light emitter while increasing the current level flowing to the blue and/or green light emitters (e.g., by selectively adjusting a resistance level on each of the parallel electrical circuits corresponding to each of the colored light emitters).

Such a configuration may be particularly useful when activating the portable lighting device 10 in a dim or dark environment, by gradually introducing red, then blue and green light to allow a user's eyes to acclimate to the increasing light level emitted from the portable lighting device 10. In certain embodiments, the controller 22 may configure the relative color of light emitted from the light source 21 based at least in part on environmental characteristics detected by the controller 22 and the one or more sensors. For example, upon detecting the environmental brightness level is below an environmental brightness threshold, the controller 22 may be configured to decrease the rate of brightness increase of the light source 21, and/or may decrease the rate of introducing blue and/or green light into the emitted light from the light source to permit a user's eyes time to adjust to the increasing light level of the portable lighting device 10.

Figure 6:
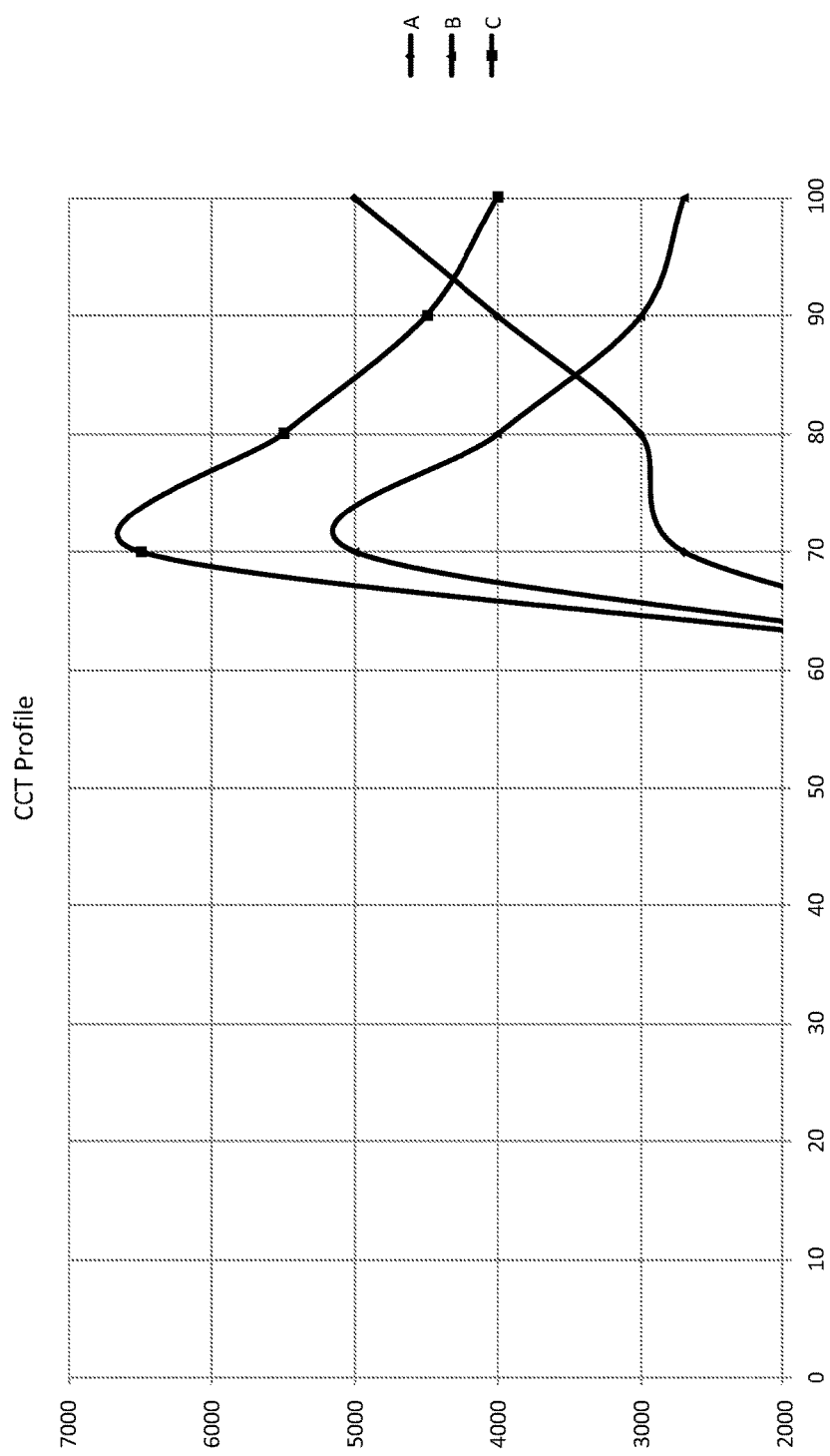

Moreover, the controller 22 may be configured to adjust the color temperature (CCT level) of the emitted light. The controller 22 may thus enable a user's eyes to adjust to a new color temperature of emitted light during the transient ramp up period of the portable lighting device 10. As shown in FIG. 6, the controller 22 may be configured to begin by causing the light source 21 to emit a warm-color (low CCT level) light, for example, by providing a majority of the emitted light from a red light emitter, and may gradually increase the CCT level to a cooler light color, by introducing an increasing percentage of emitted light from blue and/or green light emitters.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A portable lighting device having a power switch and an onboard controller configured to:
    monitor characteristics of one or more onboard device components; and
    after the power switch is activated, initialize a start-up sequence to gradually increase the brightness emitted by the portable lighting device to a steady-state brightness level, wherein the start-up sequence defines a brightness rate of change selected from a plurality of predefined brightness rates of change, and wherein the brightness rate of change is selected based at least in part on one or more of the monitored characteristics.

2. The portable lighting device of claim 1, further comprising an onboard power supply and a light source comprising one or more light emitting diodes, and
    wherein the onboard controller comprises a current regulation circuit configured to gradually increase a current level flowing from the onboard power supply to the light source in accordance with the brightness rate of change to cause a gradual increase in the brightness emitted by the portable lighting device.

3. The portable lighting device of claim 1, wherein the one or more onboard device components comprise an onboard power supply and a light source, and wherein the portable lighting device further comprises at least one characteristic sensor configured to monitor the one or characteristics of the onboard device components.

4. The portable lighting device of claim 3, wherein the onboard power supply comprises one or more batteries, and wherein the onboard controller is configured to:
    detect a battery output voltage of the one or more batteries; and
    identify a brightness rate of change for the light source based at least in part on the detected battery output voltage.

5. The portable lighting device of claim 4, wherein the start-up sequence for the portable lighting device defines a steady-state brightness level for the light source and wherein the onboard controller is configured to select the steady-state brightness level based at least in part on the detected battery output voltage.

6. The portable lighting device of claim 1, wherein the onboard controller is further configured to, after the portable lighting device reaches the steady-state brightness level, change the steady-state brightness level based on one or more of the monitored characteristics.

7. The portable lighting device of claim 6, wherein the one or more onboard device components comprise an onboard power supply; and
    wherein the onboard controller is configured to change the steady-state brightness level upon determining a voltage of the onboard power supply satisfies a dimming criteria.

8. The portable lighting device of claim 6, wherein the one or more onboard device components comprise a light source; and
    wherein the onboard controller is configured to change the steady-state brightness level upon determining that a temperature of the light source satisfies a dimming criteria.

9. The portable lighting device of claim 1, wherein the onboard controller is further configured to:
    monitor one or more environmental characteristics; and
    generate the startup sequence based at least in part on the one or more environmental characteristics.

10. The portable lighting device of claim 9, further comprising an environmental brightness sensor configured to monitor a brightness of an environment surrounding the portable lighting device.

11. The portable lighting device of claim 1, wherein the onboard controller is further configured to:
    after the power switch is deactivated, initialize a power-down sequence to gradually decrease the brightness emitted by the portable lighting device to an off state, wherein the power-down sequence defines a second brightness rate of change.

12. A portable lighting device controller configured to:
    monitor characteristics of one or more portable lighting device components; and
    after a power switch for the portable lighting device is activated, initialize a start-up sequence to gradually increase an output brightness emitted by the portable lighting device to a steady-state brightness level, wherein the start-up sequence defines a brightness rate of change selected from a plurality of predefined brightness rates of change, and wherein the brightness rate of change is selected based at least in part on one or more of the monitored characteristics.

13. The portable lighting device controller of claim 12, further configured to gradually increase the current level flowing across the portable lighting device controller in accordance with the defined brightness rate of change.

14. The portable lighting device controller of claim 12, comprising an integrated circuit chip and one or more characteristic sensors in electrical communication with the integrated circuit chip, and wherein monitoring characteristics of the one or more portable lighting device components comprises monitoring outputs received from the one or more characteristic sensors.

15. The portable lighting device controller of claim 14, wherein the one or more characteristic sensors comprise:
   a voltage sensor configured to monitor an output voltage of one or more batteries powering the portable lighting device; and
   a temperature sensor configured to monitor a temperature of a light source.

16. The portable lighting device controller of claim 14, further configured to:
   detect a battery output voltage of the one or more batteries; and
   select a brightness rate of change for the light source based at least in part on the detected battery output voltage.

17. The portable lighting device controller of claim 15, wherein the start-up sequence for the portable lighting device defines a steady-state brightness level for the light source and wherein the portable lighting device controller is configured to select the steady-state brightness level based at least in part on the detected battery chemistry.

18. A method for initializing a portable lighting device, wherein the portable lighting device comprises a power switch and an onboard controller, the method comprising:
   monitoring, via the onboard controller, characteristics of one or more onboard device components; and
   after the power switch is activated, initializing a start-up sequence to gradually increase the brightness emitted by the portable lighting device to a steady-state brightness level, wherein the start-up sequence defines a brightness rate of change selected from a plurality of predefined brightness rates of change, and wherein the brightness rate of change is selected based at least in part on one or more of the monitored characteristics.

19. The method of claim 18, wherein the portable lighting device further comprises an onboard power supply and a light source, and wherein the method further comprises:
   detecting a battery output voltage of the one or more batteries; and
   identifying a brightness rate of change for the light source based at least in part on the detected battery output voltage.

20. The method of claim 18, wherein the portable lighting device further comprises a light source, and wherein the method further comprises: after the portable lighting device reaches the steady-state brightness level, changing the steady-state brightness level upon determining that a temperature of the light source satisfies a dimming criteria.

* * * * *